United States Patent
Hiremane et al.

(10) Patent No.: US 9,361,244 B2
(45) Date of Patent: Jun. 7, 2016

(54) APPARATUS FOR HARDWARE ACCELERATED RUNTIME INTEGRITY MEASUREMENT

(75) Inventors: Radhakrishna Hiremane, Beaverton, OR (US); Anil S. Keshavamurthy, Portland, OR (US)

(73) Assignee: Intel Corporation, Santa Clara, CA (US)

(*) Notice: Subject to any disclaimer, the term of this patent is extended or adjusted under 35 U.S.C. 154(b) by 129 days.

(21) Appl. No.: 13/993,037

(22) PCT Filed: Dec. 29, 2011

(86) PCT No.: PCT/US2011/067877
§ 371 (c)(1),
(2), (4) Date: Aug. 21, 2014

(87) PCT Pub. No.: WO2013/101083
PCT Pub. Date: Jul. 4, 2013

(65) Prior Publication Data
US 2014/0359239 A1    Dec. 4, 2014

(51) Int. Cl.
*G06F 12/14* (2006.01)
*G06F 21/57* (2013.01)

(52) U.S. Cl.
CPC .......... *G06F 12/1416* (2013.01); *G06F 21/575* (2013.01); *G06F 21/577* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 5,928,362 A | * | 7/1999 | Cardillo | G06F 9/4411 726/20 |
| 6,697,972 B1 | * | 2/2004 | Oshima | G06F 11/0751 714/55 |
| 8,127,292 B1 | * | 2/2012 | Dobrovolskiy | G06F 9/45541 717/174 |
| 2004/0181708 A1 | * | 9/2004 | Rothman | G06F 11/0748 714/10 |
| 2008/0163209 A1 | * | 7/2008 | Rozas | G06F 9/45558 718/1 |
| 2009/0164770 A1 | * | 6/2009 | Zimmer | G06F 21/51 713/2 |
| 2009/0172822 A1 | * | 7/2009 | Sahita | G06F 21/575 726/27 |
| 2012/0042376 A1 | * | 2/2012 | Dolgunov | G06F 9/4406 726/19 |
| 2012/0246641 A1 | * | 9/2012 | Gehrmann | G06F 9/445 718/1 |

* cited by examiner

*Primary Examiner* — Yaima Rigol
(74) *Attorney, Agent, or Firm* — Nicholson De Vos Webster & Elliott LLP

(57) ABSTRACT

Techniques are described for providing processor-based dedicated fixed function hardware to perform runtime integrity measurements for detecting attacks on system supervisory software, such as a hypervisor or native Operating System (OS). The dedicated fixed function hardware is provided with memory addresses of the system supervisory software for monitoring. After obtaining the memory addresses and other information required to facilitate integrity monitoring, the dedicated fixed function hardware activates a lock-out to prevent reception of any additional information, such as information from a corrupted version of the system supervisory software. The dedicated fixed function hardware then automatically performs periodic integrity measurements of the system supervisory software. Upon detection of an integrity failure, the dedicated fixed function hardware uses out-of-band signaling to report that an integrity failure has occurred.
The dedicated fixed function hardware provides for runtime integrity verification of a platform in a secure manner without impacting the performance of the platform.

25 Claims, 5 Drawing Sheets

APPARATUS FOR HARDWARE ACCELERATED RUNTIME INTEGRITY MEASUREMENT

CROSS-REFERENCE TO RELATED APPLICATION

This patent application is a U.S. National Phase Application under 35 U.S.C. §371 of International Application No. PCT/US2011/067877, filed Dec. 29, 2011, entitled AN APPARATUS FOR HARDWARE ACCELERATED RUNTIME INTEGRITY MEASUREMENT.

TECHNICAL FIELD

Embodiments described herein generally relate to operation of processors. More particularly, some embodiments relate to dedicated fixed function hardware that automatically performs integrity verification of software at run-time.

BACKGROUND ART

A hypervisor, also called a virtual machine manager (VMM), is an example of system supervisory software that implements a hardware virtualization technique to allow multiple operating systems, termed guests, to run concurrently on a host computer. Since malware can attack system software at boot-time or at run-time, hypervisor security has become one of the key concerns in the field of virtualization and cloud computing. Run-time manipulations of system supervisory software by malware, that may open backdoors that allow for exploitation of the system supervisory software, have proven to be difficult to detect.

Technologies such as the Intel® Trusted Execution Environment may be used to ensure trusted boots of hypervisors. Using these technologies, hypervisors that have been manipulated by malware may be detected, and prevented from booting, during a trusted boot of the hypervisor. Using trusted boot technology, administrators of cloud computing data centers may routinely reboot servers to verify the integrity of the server's hypervisor(s), as well as other system supervisory software hosted by the server. However, periodically rebooting servers may require a high degree of planning and coordination, especially in a large data center, to assure that service requirements are met and service availability in not negatively impacted.

Software based methods may be implemented to monitor the run-time integrity of system software, such as hypervisors. However, these software based methods may actually steal clock cycles from the central processing unit (CPU) that is being used to execute the hypervisor itself, thus negatively impacting system performance. Alternatively, these software methods may steal clock cycles from other CPUs being used, or that could be used, to provide services by the data center. Additionally, these software methods may be subject to the same malware attacks as the system software they are trying to protect, thus creating a security concern. Consequently, assuring the integrity of system software in a virtualized environment, such as a cloud computing environment, is a costly endeavor.

Today's processor-based hardware lacks visibility into the run-time integrity of a hypervisor or VMM running on a system with full access privileges. Malware that has attacked the privileged system software can easily hide itself from Anti-Malware agents and hence go undetected at runtime.

DETAILED DESCRIPTION

Overview

This disclosure describes embodiments of a dedicated fixed function hardware component (i.e., processing unit) for performing runtime integrity measurements of system software (i.e., low-level system software, system supervisory software or a supervisory software component). In the context of this disclosure, system software may be defined as a hypervisor or virtual machine manager (VMM) running directly on the hardware of the processor (e.g., the bare metal); a native operating system (OS) running directly on the hardware of the processor; a hypervisor, VMM or OS that is hosted by a hypervisor, VMM or OS; system software used to configure and/or manage hardware of a processor, or the like.

In an embodiment, the dedicated fixed function hardware component may include hardware that is part of the core of a processor. The core of the processor may contain components of the processor involved with the execution of instructions, such as a central processing unit (CPU), an arithmetic logic unit (ALU), a floating-point unit (FPU), level 1 (L1) CPU cache memory, or the like.

In another embodiment, the dedicated fixed function hardware component may include hardware that is part of the uncore of a processor. The uncore may include hardware components that are not in the core, but which are essential for performing functions of the core. Examples of uncore components may include, for example, an Intel® QuickPath Interconnect (QPI), a memory controller, a bus controller, or the like.

In another embodiment, the dedicated fixed function hardware component may include hardware that is part of a chip set associated with a processor. As an example, the dedicated fixed function hardware component may include hardware that is part of a platform controller hub (PCH) microchip, hardware associated with a Peripheral Component Interconnect (PCI) device, or the like.

In the context of this disclosure, a hardware component specifically includes physical hardware, as opposed to a software component that may merely include executable instructions, such as a computer software program.

In addition to being a hardware component, the dedicated fixed function hardware component (i.e., fixed function hardware), as described herein, has a hardware structure or hardware architecture that is fabricated to perform a dedicated fixed function.

Illustrative System Architecture

Figure 1:
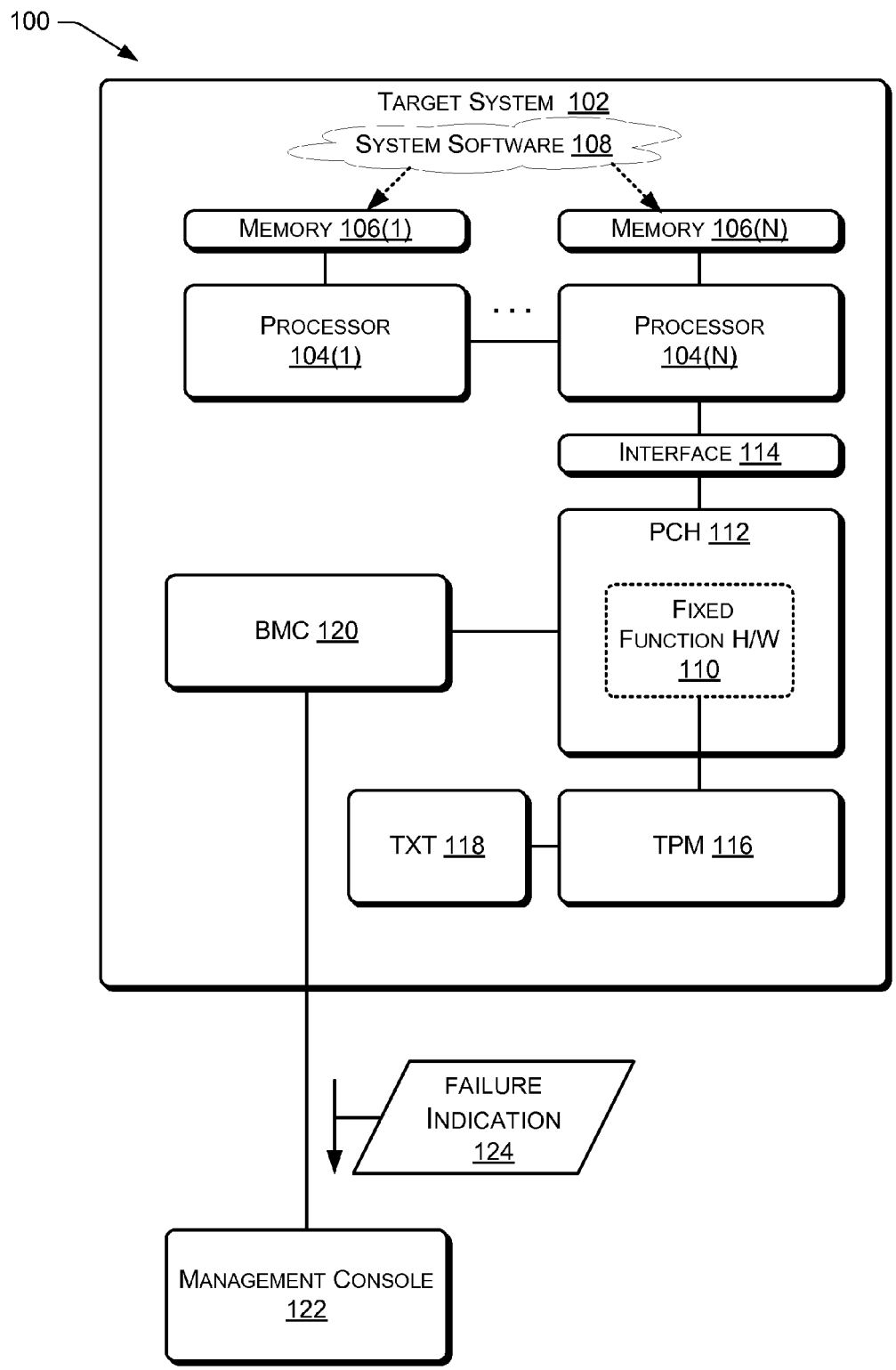
FIG. 1 depicts an example environment usable to perform a runtime integrity measurement of software.

FIG. 1 depicts an example environment 100 usable to perform a runtime integrity measurement of system software executing on target system 102. Target system 102 may include a chip set having one or more processors 104(1) to 104(N). Processor 104(1) may have an associated memory 106(1). Memory 106(1) may include any memory accessible by processor 104(1). Memory 106(1) may include level 1

(L1), L2 and/or L3 cache as well as Random Access Memory (RAM), Read Only Memory (ROM), System Management RAM (SMRAM), or the like.

Processor 104(N) may have an associated memory 106(N). Similar to memory 106(1), memory 106(N) may include any memory accessible by processor 104(N). Memory 106(N) may include L1, L2 and/or L3 cache as well as Random Access Memory (RAM), Read Only Memory (ROM), System Management RAM (SMRAM), or the like. Additionally, processor 104(1) may have full or partial access to memory 106(N) and processor 104(N) may have full or partial access to memory 106(1). Any one or more of processors 104(1) to 104(N) may use at least a part of memory 106(1) to 106(N) to load, boot and/or execute system software 108.

Dedicated fixed function hardware component 110, used to monitor the run-time integrity of system software 108, is shown in FIG. 1 as integrated with a platform controller hub (PCH) 112. However, as described above, fixed function hardware component 110 may be part of the core, uncore, an associated chip set (not shown), a PCI device, an edge device associated with target system 102, or the like. PCH 112 may interface to one or more of processors 104(1) to 104(N) via interface 114. For example, interface 114 may be a Direct Media Interface (DMI).

Dedicated fixed function hardware component 110 may also securely interface to a trusted module, such as trusted platform module (TPM) 116. TPM 116 may securely store trusted information associated with system software 108, such as a trusted initial hash value of system software 108. TPM 116 may also work in conjunction with a hardware extension that includes a trusted execution technology (TXT), such as TXT 118. TXT 118 may be used to facilitate a secure boot of system software 108.

In an embodiment, during a trusted or secure boot, system software 108 may provide a list of memory addresses to fixed function hardware component 110 via, for example, in-band interface 114. This list of memory addresses may be pointers to static text and/or static data segments of system software 108. In an alternate embodiment, TXT 118 may facilitate the transfer of the list of addresses associated with system software 108 to fixed function hardware component 110.

After securely booting system software 108, during the run-time execution of system software 108 by at least one of processors 104(1) to 104(N), fixed function hardware component 110 may perform a hashing, for example, of the static text segments and/or static data segments of system software 108, to create a run-time hash value of system software 108. Fixed function hardware component 110 may then retrieve the trusted initial hash value of system software 108 from TPM 116, and compare the trusted initial hash value with the run-time hash value.

In an embodiment, if the comparing performed by fixed function hardware component 110 indicates an integrity failure of system software 108, fixed function hardware component 110 may report or indicate the integrity failure to a reporting agent and/or manageability engine, such as baseband management controller (BMC) 120. The integrity measurement failure of system software 108 may then be indicated at management console 122 via failure indication 124. In an embodiment, failure indication 124 may be sent out-of-band. For example, failure report 124 may be sent via an Intelligent Platform Management Interface (IPMI) or BMC protocol 124. This out-of-band reporting of failure indication 124 is advantageous because it may occur independent of system software 108. Additionally, out-of-band reporting of failure indication 124 may provide for an additional layer of integrity failure reporting security, since system software 108 may not have control of, or visibility into, the out-of-band reporting channel.

In an alternate embodiment, upon detecting an integrity failure of system software 108, fixed function hardware component 110 may send an interrupt to a reporting agent and/or manageability engine (e.g., BMC 120) that informs management software associated with management console 122 of an integrity measurement failure.

Illustrative Fixed Function Architecture

Figure 2:
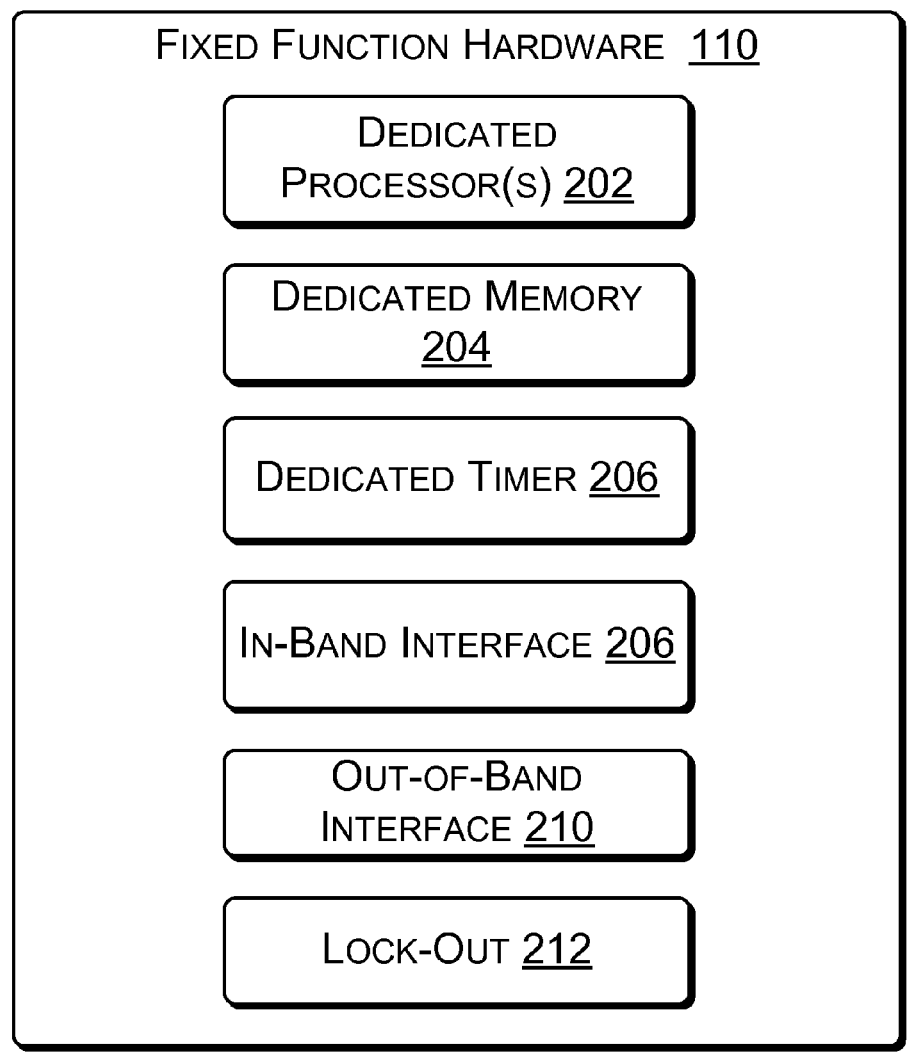
FIG. 2 depicts an example hardware architecture to perform a runtime software integrity measurement.

FIG. 2 depicts an example hardware architecture 200 of dedicated fixed function hardware component 110. As discussed previously, hardware architecture 200 may be implemented as a hardware extension of a microprocessor on one or more respective chipsets associated with target system 102.

For example, hardware architecture 200 includes one or more dedicated processor(s) 202 that facilitate integrity measurement of system software 108. Dedicated processor(s) 202 are separate from processors 104(1) to 104(N) of target system 102, such that integrity measurements performed by fixed function hardware component 110 do not steal any clock cycles from processors 104(1) to 104(N). Dedicated processor(s) 202 may also be isolated from target system 102, such that any other components of target system 102 may not directly control or monitor any state or condition of dedicated processor(s) 202. Therefore, fixed function hardware component 110 may perform integrity verification of system software 108 independent of any control or triggering by any other of the components of target system 102. Additionally, dedicated processor(s) 202 may access any of memory 106(1) to 106(N), as well as any other memory locations accessible by target system 102.

Fixed function hardware component 110 may also include dedicated memory 204. Dedicated memory 204 may only be addressable by dedicated processor(s) 202. As such, dedicated memory 204 is separate and distinct from any of memory 106(1) to 106(N) of target system 102. Dedicated memory 204 is used by fixed function hardware component 110, at least in part, for performing integrity measurements of system software 108. Thus, dedicated memory 204 may not support Direct Memory Access (DMA) by any other components of target system 102, as well as any hardware subsystems external to target system 102.

Fixed function hardware component 110 may also include dedicated timer 206. Dedicated timer 206 may be used by fixed function hardware component 110 to trigger or initiate an integrity measurement of system software 108. In an embodiment, dedicated timer 206 is a dedicated resource of fixed function hardware component 110, such that dedicated timer 206 may not be controlled or configured by any hardware or software subsystems external to hardware architecture 200. Dedicated timer 206 may operate in a synchronous manner, an asynchronous manner, or both. In an embodiment, dedicated timer 206 may operate under the control of dedicated processor(s) 202. In another embodiment, dedicated timer 206 may operate independent of dedicated processor(s) 202, such that dedicated timer 206 and/or fixed function hardware component 110 may be pre-programmed to periodically perform an integrity measurement of system software 108 in a predefined manner.

Fixed function hardware component 110 may also include an in-band interface 208 and an out-of-band interface 210. In-band interface 208 and out-of-band interface 210 may be logically or physically separated to facilitate communications with fixed function hardware 110. For example, in-band interface 208 may be used to receive or obtain a range and/or list of memory addresses for integrity monitoring by fixed function hardware 110. Out-of-band interface 210 may be used by fixed function hardware component 110 to indicate an integrity failure, for example, via BMC 120. In-band interface 208, out-of-band interface 210, a combination of in-band interface 208 and out-of-band interface 210, or a standard or proprietary interface (not shown) may be used to facilitate secure communications between fixed function hardware component 110 and TPM 116.

In an embodiment, after an initial receipt of the range or list of memory addresses for integrity monitoring by fixed function hardware 110, lock-out 212 may be invoked by fixed function hardware 110 to prevent any further reception of memory addresses by fixed function hardware 110.

For example, during a trusted boot or initial trusted load of system software 108 by target system 102, the complete range or list of memory addresses for integrity monitoring may be provided to fixed function hardware 110 via in-band interface 208. In an embodiment, once the complete range or list of memory addresses are received by fixed function hardware 110, lock-out 212 may be invoked to prevent any further reception of memory addresses and all other information by fixed function hardware 110. In another embodiment, the complete range or list of memory addresses may be followed by an enablement signal, thus invoking lock-out 212 to prevent any further reception of memory addresses by fixed function hardware 110. In these embodiments, lock-out 212 may be used to prevent a corrupted version of system software 108 from providing different memory address to fixed function hardware 110 at a later time.

Illustrative System Operation

Figure 3:
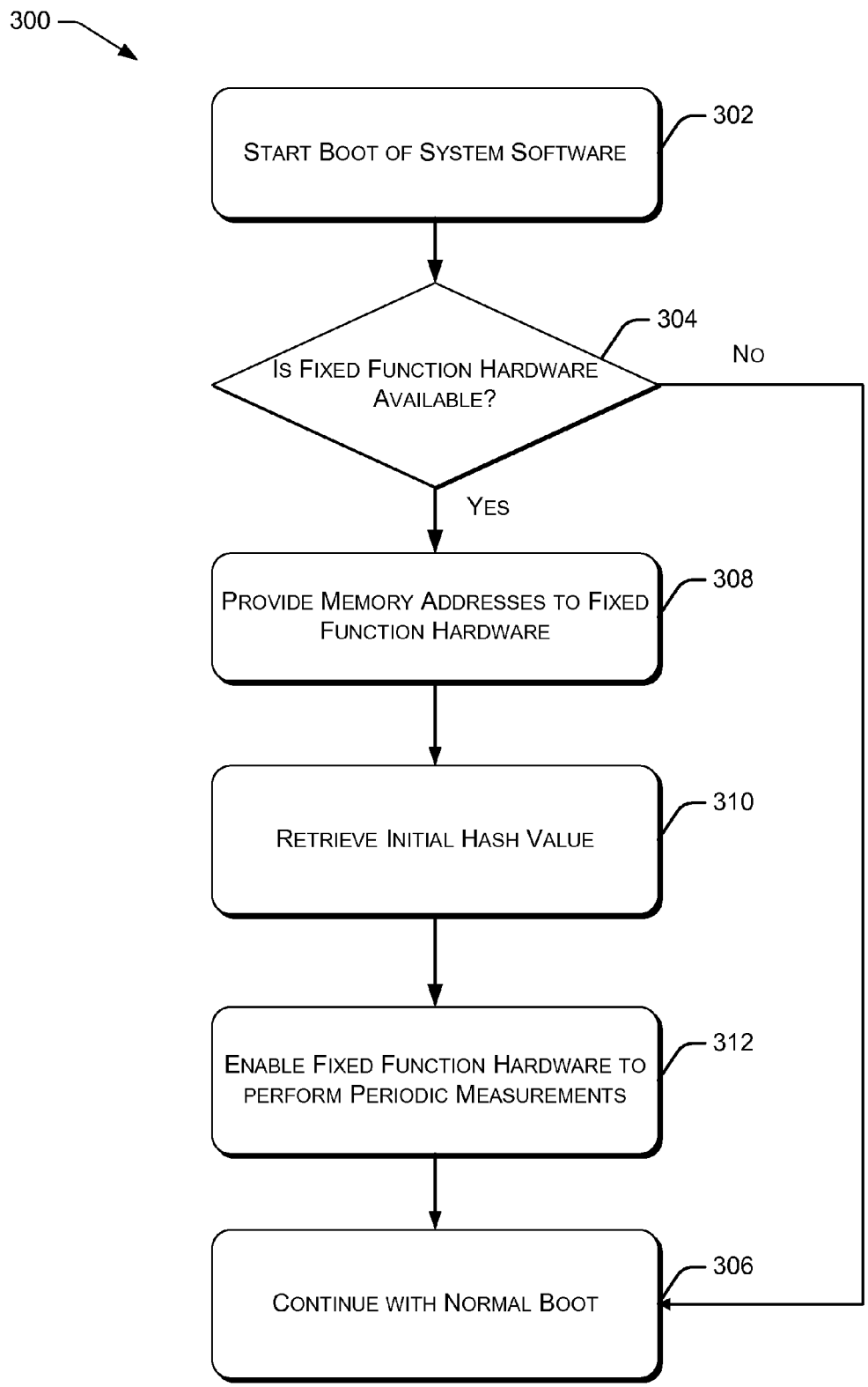
FIG. 3 is a flowchart showing an illustrative method that includes enabling dedicated fixed function hardware to perform run-time integrity verification of system software.
Figure 4:
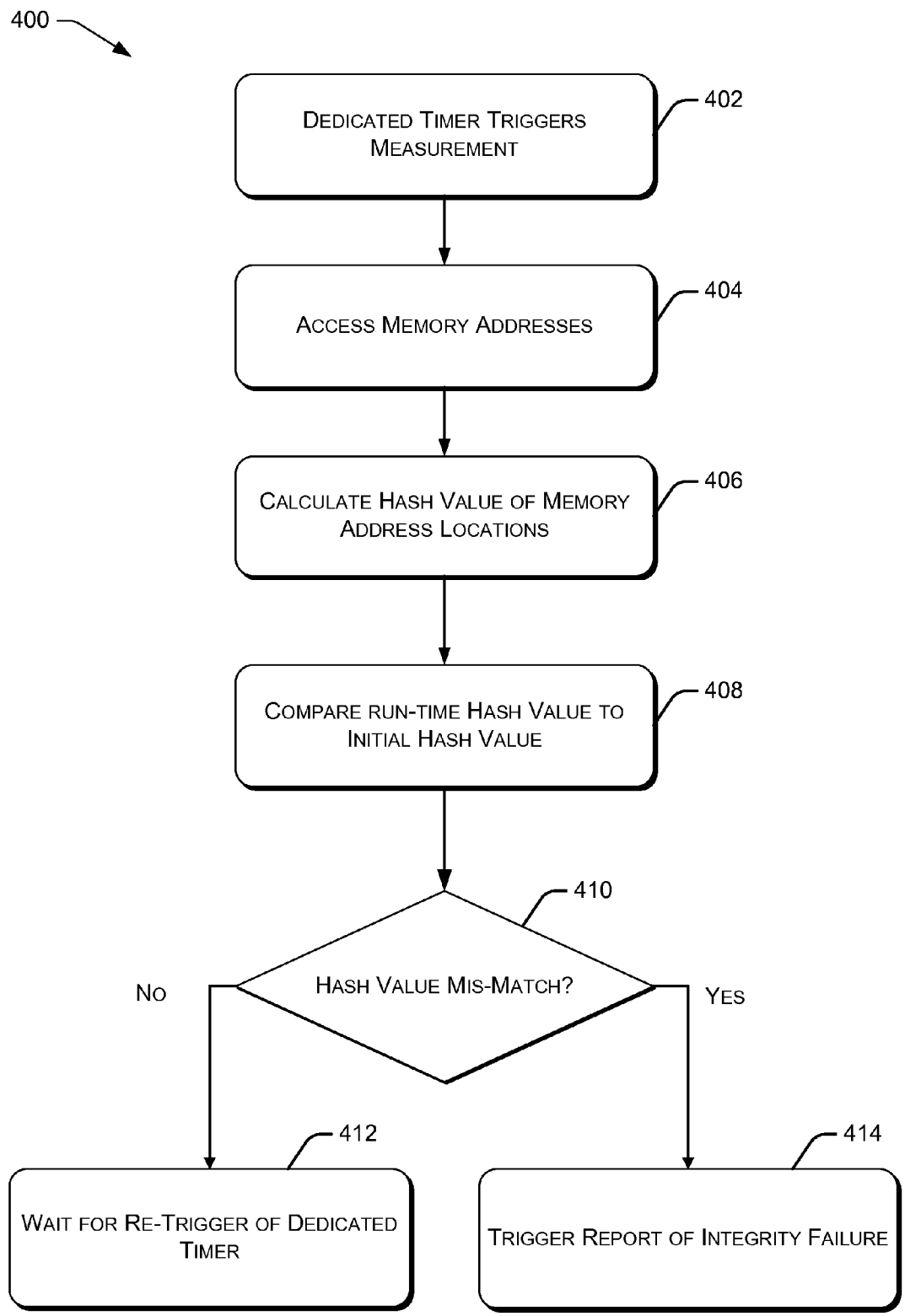
FIG. 4 is a flowchart showing an illustrative method of performing a run-time integrity verification of system software.
Figure 5:
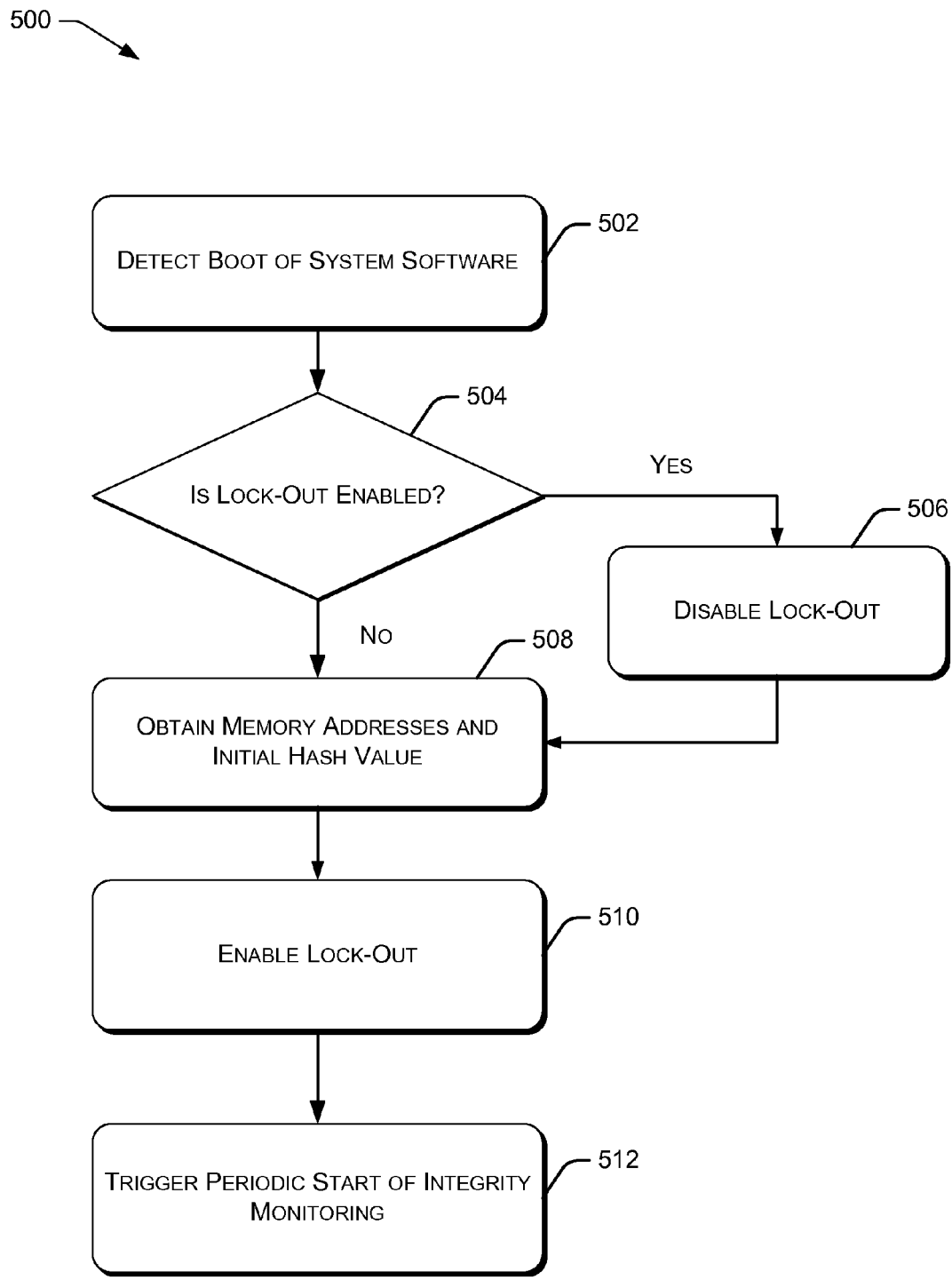
FIG. 5 is a flowchart showing an illustrative method of preparing for a run-time integrity verification of system software.

FIGS. 3-5 are example flowcharts illustrating various aspects of the integrity checking system described herein.

FIG. 3 is a flowchart showing an illustrative method 300 that includes enabling dedicated fixed function hardware to perform run-time integrity verification of system software.

At 302, a boot of system software 108 is initiated. The system software that is booted may include, but is not limited to, a hypervisor, a VMM, a monolithic kernel (e.g., Linux, Windows), a microkernel, or any other supervisory software that directly controls, for example, the hardware of target system 102.

At 304, target system 102 determines if dedicated fixed function hardware component 110 is available. In an embodiment, system software 108 performs this determination during a trusted boot. In an alternate embodiment, this determination is facilitated by TXT 118.

At 304, if it is determined that dedicated fixed function hardware component 110 is not available, control passes to 306 where a normal boot of system software 108 continues. If it is determined that dedicated fixed function hardware component 110 is available, control passes to 308.

At 308, one or more ranges and/or one or more lists of memory addresses are provided to fixed function hardware 110. In an embodiment, these memory addresses may be associated with static text and/or static data segments of system software 108 used to previously calculate an initial hash value of system software 108. A pointer that points to the initial hash value and/or an associated hash key may also be provided to fixed function hardware 110 before, during or after the memory addresses are provided.

At 310, fixed function hardware 110 retrieves or reads the initial hash value. In an embodiment, the initial hash value may be retrieved or read from a secure memory store, such as TPM 116. The pointer, as well as the hash key, may be used to facilitate retrieval or reading of the initial hash value from TPM 116. Fixed function hardware 110 may retrieve or read the initial hash value before, during or after obtaining the memory addresses.

At 312, fixed function hardware 110 is enabled. In an embodiment, fixed function hardware 110 is self enabled, such that based on obtaining at least one of the memory addresses, the initial hash value pointer, the hash key, or the initial hash value, fixed function hardware 110 determines to enable itself. In another embodiment, fixed function hardware 110 may receive an enabling signal associated with at least one of the memory addresses, the initial hash value pointer, the hash key, or the initial hash value. Fixed function hardware 110 may then become enabled, or enter an enabled state, based on the enabling signal.

Once enabled, fixed function hardware 110 may activate lock-out 212. Once lock-out 212 is activated, fixed function hardware 110 will no longer accept additional information, such as memory addresses, pointers or hash keys. In an embodiment, fixed function hardware 110 may deactivate lock-out 212 upon detecting a re-boot of system software 108, or upon detecting a re-boot of target system 102. At 306, normal boot of system software 108 continues.

After booting, during a run-time execution of system software 108, memory locations associated with these memory addresses may be hashed. Assuming system software 108 has not been corrupted, for example, by malware, an appropriate hash of the memory locations obtained during a run-time execution of system software 108 should yield or indicate the initial hash value.

FIG. 4 is a flowchart showing an illustrative method 400 of an embodiment that includes performing a run-time integrity verification of system software after fixed function hardware 110 is enabled.

At 402, dedicated timer 206 triggers fixed function hardware 110 to perform an integrity verification measurement of system software 108. At 404, fixed function hardware 110 accesses memory locations indicated by the previously obtained memory addresses.

At 406, fixed function hardware 110 calculates a run-time hash value associated with the memory locations. The run-time hash value may include one or more hash values associated with the memory locations. The one or more hash values may be combined, all or in part, in any known fashion, to create the run-time hash value.

At 408, the run-time hash value is compared to the initial hash value. The comparison is performed to determine if the run-time hash value is appropriately associated with the initial hash value. The comparison may include a numeric or alpha-numeric equivalency comparison, however, the comparison is not so constrained. Any form of comparison may be performed to determine whether the run-time hash value is appropriately associated with the initial hash value. If the comparison indicates that the run-time hash value is appropriately associated with the initial hash value, then the comparison indicates a match between the run-time hash value and the initial hash value. If the comparison indicates that the run-time hash value is not appropriately associated with the initial hash value, then the comparison indicates a mis-match between the run-time hash value and the initial hash value.

At 410, if the comparison indicates that the run-time hash value matches the initial hash value, then control passes to 412. At 412, fixed function hardware 110 may enter an idle state waiting for the next trigger from dedicated timer 206, indicating the initiation of another integrity verification cycle.

On the other hand, at 410, if the comparison indicates that the run-time hash value mis-matches the initial hash value, then control passes to 414. At 414, fixed function hardware component 110 may send an interrupt or other signal to a reporting agent and/or a manageability engine (e.g., BMC 120) that causes a display or indication of a run-time integrity measurement failure of system software 108 at, for example, management console 122.

FIG. 5 is a flowchart showing an illustrative method 500 of an embodiment that includes preparing for a run-time integrity verification of system software.

At 502, fixed function hardware 110 detects that a boot of system software 108 has been initiated. The boot may be an initial boot or a re-boot of system software 108. The boot may also include a trusted boot of system software 108, as facilitated by TXT 118.

At 504, fixed function hardware 110 detects whether lock-out 212 is enabled. If fixed function hardware 110 detects that lock-out 212 is enabled, then control passes to 506. In an embodiment, at 506, fixed function hardware 110 disables lock-out 212 if a boot of system software 108 has been detected. In another embodiment, at 506, fixed function hardware 110 disables lock-out 212 only if a trusted boot of system software 108 has been detected.

At 504, if fixed function hardware 110 detects that lock-out 212 is not enabled, then control passes to 508.

At 508, fixed function hardware 110 obtains memory addresses associated, for example, with static text and static data segments of system software 108. The memory addresses may be provided to fixed function hardware 110 by at least one of system software 108, TXT 118 or target system 102. Fixed function hardware 110 may also obtain the initial hash value associated with system software 108 from a secure store, such as TPM 116. In an embodiment, the initial hash value may have been placed in the secure store prior to booting system software 108. In a different embodiment, the initial hash value may be placed in the secure store during a trusted booting of system software 108.

At 510, fixed function hardware 110 is enabled, which causes fixed function hardware 110 to activate lock-out 212.

At 512, dedicated timer 206 is set to trigger a periodic start of fixed function hardware 110.

In an embodiment, once dedicated timer 206 is set, fixed function hardware 110 takes over performing integrity measurements of system software 108 by hashing the content of the memory addresses, checking the hash value against the initial hash value, reporting the status when required and automatically retriggering the hashing event at periodic intervals. Fixed function hardware 110 performs these integrity measurements independent of processors 104(1) to 104(N) of target system 102, and without intervention of any external software, including system software 108.

An advantage of one or more embodiments as described herein is that a fully hardware based approach is fast, because it uses dedicated processor(s) 202 and dedicated memory 204 and does not steal any clock cycles from processors 104(1) to 104(N) during integrity measurements. Additionally, a fully hardware based approach is secure, because once fixed function hardware 110 activates lock-out 212, fixed function hardware 110 will deny any and all attempts to be reprogrammed with a new set of memory addresses or any other related values or pointers during run-time execution of system software 108. The speed and security of fixed function hardware 110 is assured by its independent operation and dedicated nature. Fixed function hardware 110 has total independent control regarding when, and how often, integrity measurements will be performed. Additionally, by utilizing lock-out and secure out-of-band integrity failure reporting, malicious software, such as malware or kernel rootkits, cannot redirect, modify or block the reporting of integrity failures by fixed function hardware 110.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For instance, all optional features of an apparatus or processor described above may also be implemented with respect to the method or process described herein. Specifics in the examples may be used anywhere in one or more embodiments.

What is claimed is:

1. A processor comprising logic to:
   obtain memory addresses that point to at least a portion of a supervisory software component;
   activate a lock-out to prevent obtaining further memory addresses; and
   activate a dedicated timer to periodically trigger a run-time integrity measurement of the supervisory software component.

2. The processor of claim 1, wherein the logic to report a run-time integrity failure of the supervisory software component.

3. The processor of claim 2, wherein the logic to:
   include a first interface and a second interface;
   obtain the memory addresses via the first interface; and
   report the run-time integrity failure via the second interface.

4. The processor of claim 1, wherein the logic to obtain the memory addresses during a load-time of the supervisory software component.

5. The processor of claim 1, wherein the logic to:
   securely obtain an initial hash value of the supervisory software component from a secure store;
   calculate a hash value of contents of memory at the memory addresses; and
   compare the hash value to the initial hash value.

6. The processor of claim 5, wherein the logic to detect a run-time integrity failure of the supervisory software component if there is a mis-match between the hash value and the initial hash value.

7. The processor of claim 5, wherein the logic to report a failure indication if there is a mis-match between the hash value and the initial hash value.

8. The processor of claim 1, wherein the logic to obtain the memory addresses that point to at least a portion of the supervisory software component to include at least one of:
   a hypervisor or a virtual machine monitor (VMM);
   an operating system;
   system software used to configure hardware; or
   system software used to supervise hardware.

9. The processor of claim 1, wherein the logic to store the memory addresses to point to at least one of a static text segment or a static data segment of the supervisory software component.

10. A method comprising:
    obtaining memory addresses of system software by a hardware component of a processor;
    activating a lock-out by the hardware component to prevent obtaining further memory addresses; and
    activating a dedicated timer of the hardware component to periodically trigger a run-time integrity measurement of the system software.

11. The method of claim 10, further comprising reporting a run-time integrity failure of the system software by the hardware component.

12. The method of claim 11, wherein the obtaining of the memory addresses is to occur in a first band that differs from a second band used for the reporting of the run-time integrity failure.

13. The method of claim 10, wherein the obtaining memory addresses of system software by the hardware component comprises obtaining the memory addresses from a hypervisor or a virtual machine monitor (VMM) directly running on bare metal of the processor or a bare metal operating system natively running on the processor.

14. The method of claim 10, wherein the obtaining memory addresses of system software by the hardware component comprises obtaining the memory addresses that point to at least a portion of a hypervisor, a virtual machine monitor (VMM) or an operating system.

15. The method of claim 10, wherein the obtaining memory addresses occurs during a trusted boot of the system software.

16. The method of claim 10, further comprising:
calculating a hash value associated with the memory addresses by the hardware component; and
comparing the hash value to an initial hash value associated with the system software, wherein the initial hash value includes a hash of at least a portion of the system software.

17. The method of claim 16, wherein the at least a portion of the system software is to include at least one of a static text segment or a static data segment of the system software.

18. The method of claim 16, wherein the detecting the run-time integrity failure comprises detecting a mis-match between the hash value and the initial hash value.

19. The method of claim 16, wherein the initial hash value is securely obtained from a secure store by the hardware component.

20. A system comprising:
a configuration of execution resources to:
obtain memory addresses of system software;
activate a lock-out to prevent obtaining further memory addresses;
activate a dedicated timer to periodically trigger a run-time integrity verification of the system software; and
report a run-time integrity failure of the system software.

21. The system of claim 20, wherein the configuration of execution resources to:
obtain the memory addresses via a first interface; and
report the run-time integrity failure via a second interface.

22. The system of claim 20, wherein the configuration of execution resources to:
securely obtain an initial hash value of the system software from a secure store;
calculate a hash value of contents of memory at the memory addresses; and
compare the hash value to the initial hash value.

23. The system of claim 22, wherein the configuration of execution resources to detect the run-time integrity failure of the system software if there is a mis-match between the hash value and the initial hash value.

24. The system of claim 20, wherein the configuration of execution resources to obtain the memory addresses of the system software to include at least one of:
a hypervisor or a virtual machine monitor (VMM);
an operating system;
software used to configure hardware; or
software used to supervise hardware.

25. The system of claim 20, wherein the configuration of execution resources to obtain the memory addresses that point to at least one of a static text segment or a static data segment of the system software.

* * * * *